United States Patent [19]
Odagiri et al.

[11] Patent Number: 5,801,466
[45] Date of Patent: Sep. 1, 1998

[54] VIBRATOR ATTACHING STRUCTURE

[75] Inventors: Takashi Odagiri; Hiroki Ohno, both of Chiba, Japan

[73] Assignee: Uniden Corporation, Japan

[21] Appl. No.: 472,236

[22] Filed: Jun. 7, 1995

[30] Foreign Application Priority Data

Dec. 27, 1994 [JP] Japan .................. 6-326200

[51] Int. Cl.$^6$ .............. H02K 7/06; H02K 5/00; H04B 3/36
[52] U.S. Cl. .............. 310/81; 310/89; 310/90; 310/91; 340/407.1; 340/311.1; 74/87
[58] Field of Search .............. 310/81, 89, 91, 310/90; 340/407.1, 311.1; 74/87; 30/44, 45

[56] References Cited

U.S. PATENT DOCUMENTS

| | | |
|---|---|---|
| 3,911,416 | 10/1975 | Feder . |
| 4,134,169 | 1/1979 | Sinclair .................. 15/22 R |
| 4,266,434 | 5/1981 | Burns .................. 74/61 |
| 4,786,889 | 11/1988 | Hayasaka .................. 340/311.1 |
| 4,794,392 | 12/1988 | Selinko . |
| 4,864,276 | 9/1989 | Tribbey et al. .................. 340/407 |
| 4,879,759 | 11/1989 | Matsumoto et al. .................. 455/348 |
| 4,931,765 | 6/1990 | Rollins et al. .................. 340/407 |
| 4,950,931 | 8/1990 | Goldenberg et al. . |
| 5,025,666 | 6/1991 | Kobayashi et al. .................. 73/632 |
| 5,107,155 | 4/1992 | Yamaguchi . |
| 5,172,092 | 12/1992 | Nguyen et al. .................. 340/311.1 |
| 5,181,023 | 1/1993 | Fujii .................. 340/825.46 |
| 5,214,851 | 6/1993 | Althaus .................. 30/45 |
| 5,295,618 | 3/1994 | Saito .................. 266/196 |
| 5,345,822 | 9/1994 | Nakamura et al. .................. 73/505 |
| 5,373,207 | 12/1994 | Yamaguchi et al. .................. 310/81 |
| 5,488,351 | 1/1996 | Hedayatnia .................. 340/407.1 |
| 5,621,260 | 4/1997 | Fukuoka et al. .................. 310/154 |

FOREIGN PATENT DOCUMENTS

| | | |
|---|---|---|
| A-1-58261 | 4/1989 | Japan . |
| A-2-6694 | 2/1990 | Japan . |
| A-5-11580 | 2/1993 | Japan . |
| A-4-281629 | 10/1993 | Japan . |
| A-6-125294 | 5/1994 | Japan . |
| A-6-181445 | 6/1994 | Japan . |

*Primary Examiner*—Steven L. Stephan
*Assistant Examiner*—Michael J. Wallace, Jr.
*Attorney, Agent, or Firm*—Fish & Richardson PC

[57] ABSTRACT

A motor 3 having a rotational shaft with a counterweight 4 is held in a vibrator holder 2. The rotational shaft of the motor is inserted at a free end in a circular hole in a bearing-plate of the vibrator holder 2. The vibrator holder 2 with the motor therein is accommodates in a vibrator accommodating section 120 formed in a housing 12 of a portable terminal and fixed with screws 5 to the housing 12. The vibrator holder 120 is then covered with an index cover 17 to thereby complete the vibrator attachment, which reduces a vibrator attaching work load. The inner wall of the vibrator accommodating section 120 faces the motor to thereby prevent the motor 3 from slipping from the holder.

27 Claims, 7 Drawing Sheets

FIG.1A
FIG.1B
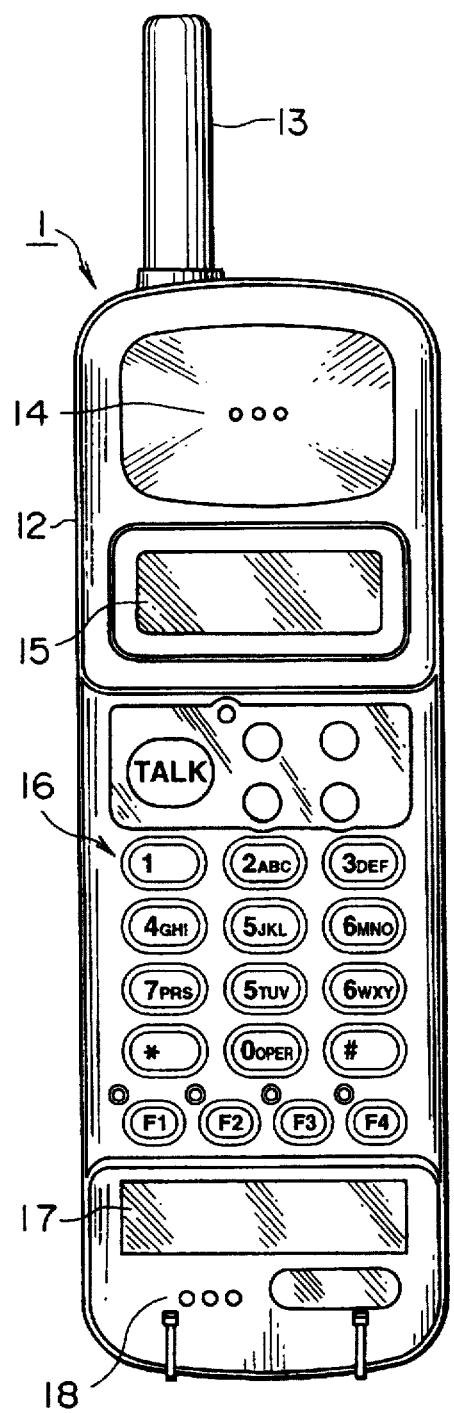
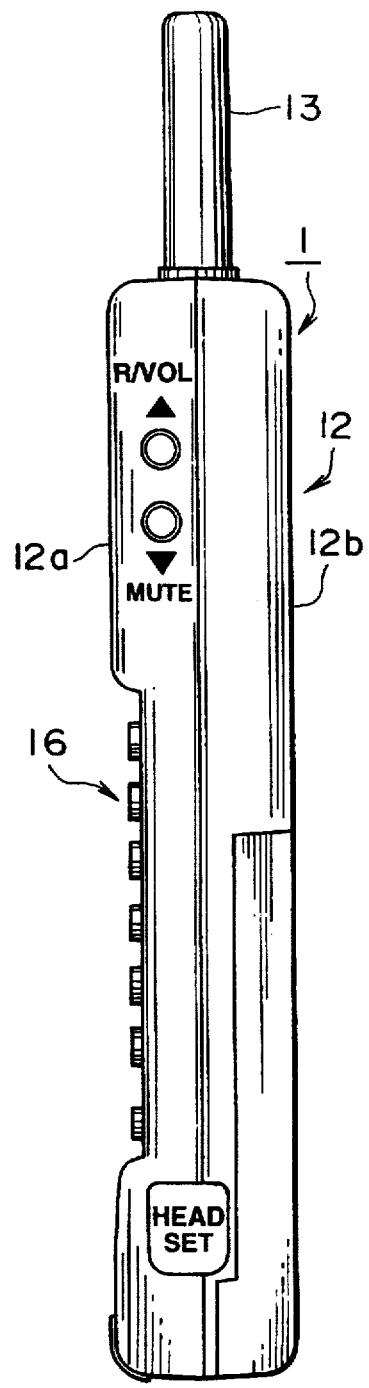

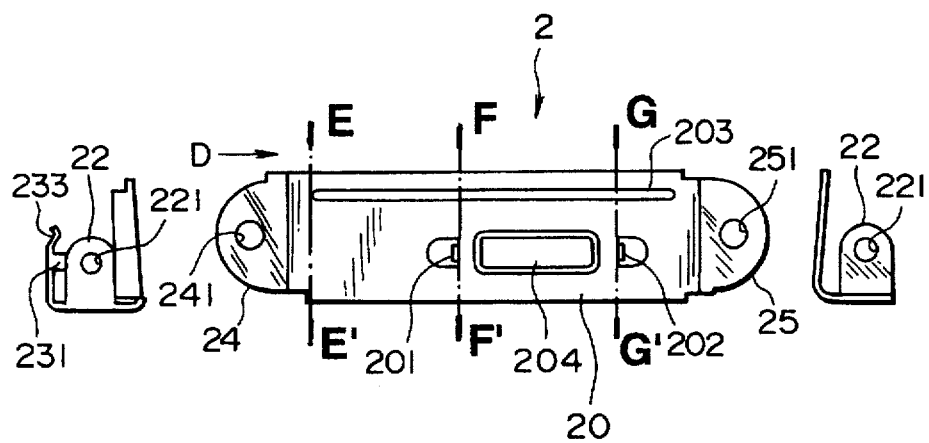

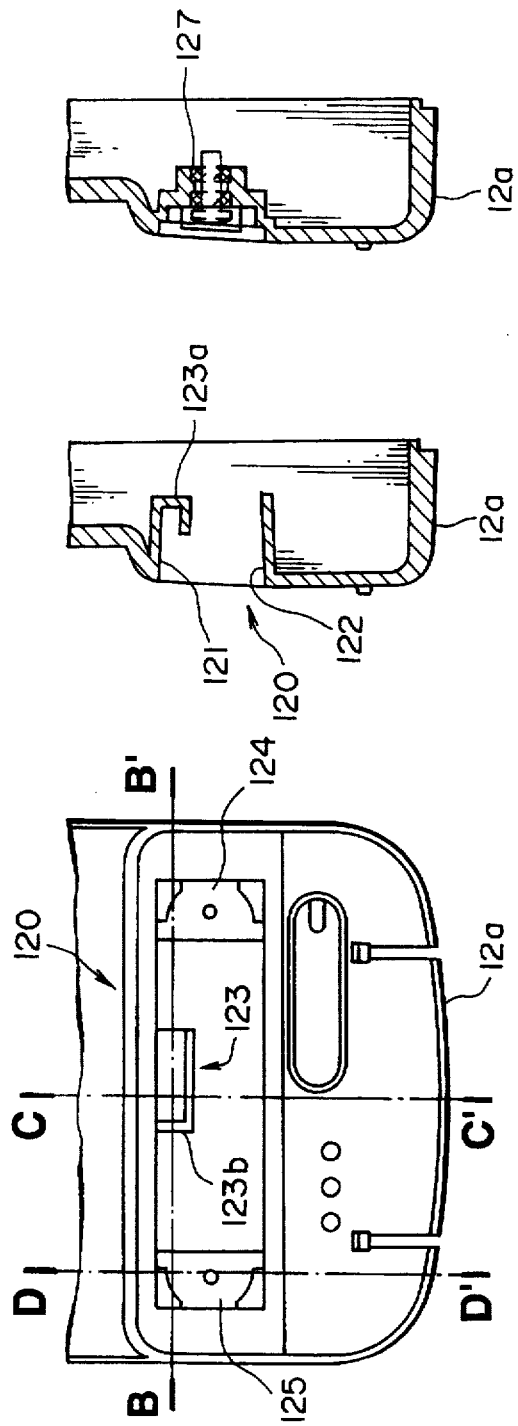
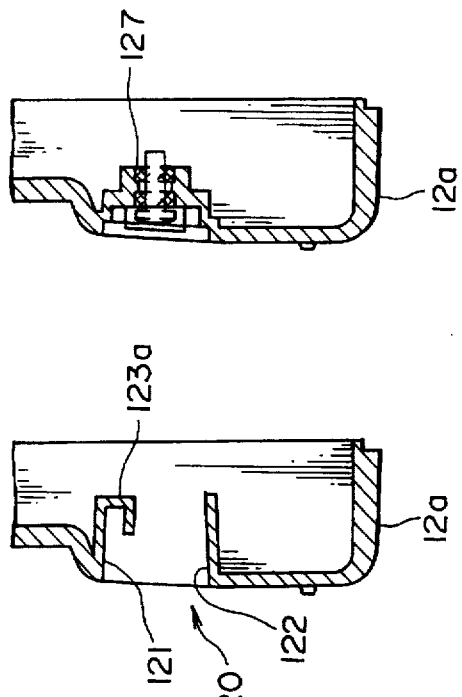
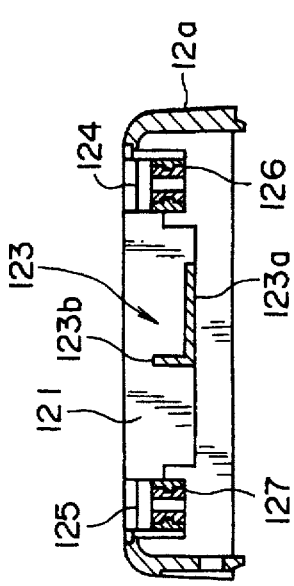

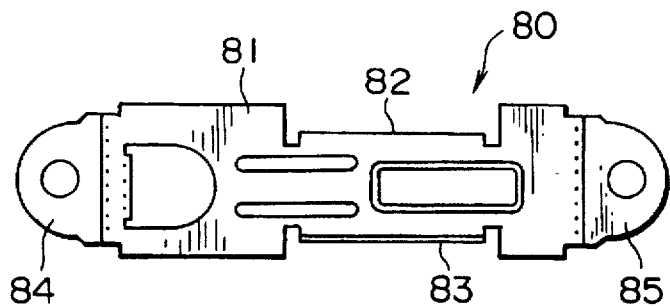
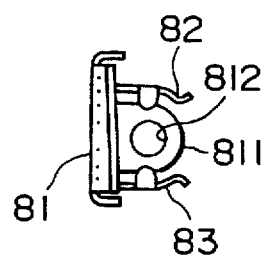
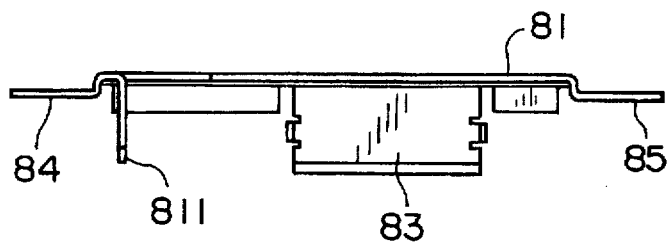
FIG.8A FIG.8C FIG.8B
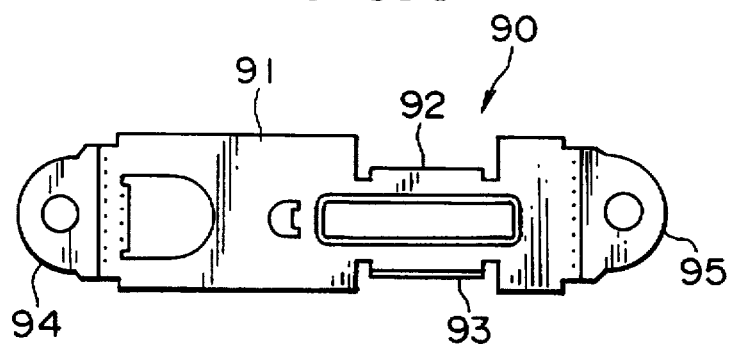
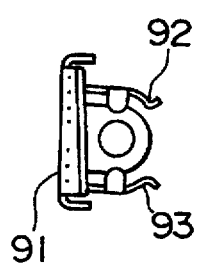
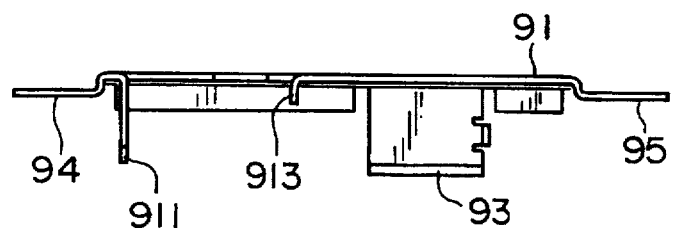
FIG.9A FIG.9C FIG.9B

VIBRATOR ATTACHING STRUCTURE

BACKGROUND OF THE INVENTION

1. Field of the Invention

The present invention relates to vibrator attaching structures and methods, and vibrator holders, and more particularly to a vibrator attaching structure and method for attaching a vibrator which vibrates a portable terminal such as a portable telephone set, and a vibrator holder for attaching and holding such vibrator.

2. Related Art

In portable terminals such as pagers or portable telephone sets, a vibrator which vibrates the housing of a portable telephone set can be used to inform the user of the arrival of an incoming signal. The vibrator is especially useful, for example, in a meeting where no ringing of a calling sound is welcome.

Generally, a vibrator is composed of a motor and a counterweight attached to a rotational shaft of the motor such that rotation of the counterweight generates vibrations. The vibrator is directly attached within the housing of the portable telephone set or to a baseplate, so that vibrations generated by the rotation of the counterweight are transmitted to the housing. For example, in a vibrator attaching structure disclosed in published unexamined Japanese Patent Applications Heisei 6-125294, and 1-58261, a motor holder is formed within a plastic housing with a vibrator attached to the motor holder. In a vibrator attaching structure disclosed in published unexamined Heisei 5-11580, a vibrator is fixed in a holder which is attached to a printed board within casing of the portable communication terminal. Thus, when the vibrator is attached, for example, to a portable telephone set, the user can not attach the vibrator unless the housing is disassembled.

However, the conventional vibrator attaching structure has many problems as follows:

First, in order to attach a vibrator to a portable telephone set after it is bought, the user is required to do very complicated work. The user who desires only a ringing function does not necessarily require the function of the vibrator. Therefore, it would be convenient if the user who requires the function of the vibrator could buy a vibrator as an option and attach it by himself. However, with the conventional vibrator attaching structure, the vibrator is attached within the housing of the telephone set, so that the user can not attach the vibrator unless the user disassembles the housing. Thus, it is very difficult for the user to attach the vibrator.

Second, a serious accident including the deformation of the rotational shaft of a motor can occur. In order to increase the vibrations of the vibrator, the weight of the counterweight attached to the rotational shaft of the motor is required to be increased. When a counterweight having a large weight is attached, the rotational shaft of the motor can be deformed (bent) and left bent beyond its elastic limit due to impact caused by an inadvertent drop of the telephone set. In order to avoid deformation of the rotational shaft of the motor, the weight of the counterweight is required to be decreased. However, it is difficult for a light counterweight to generate large vibrations and hence a portable telephone set having a relatively large weight cannot be vibrated sufficiently.

Third, slippage of the motor from the housing can occur. Conventionally, in order to simplify the work to attach a motor, the motor is fitted into a recess (accommodating section) formed in the telephone housing or holder without using screws. However, since there are no means which prevent the motor slippage in the direction of motor slippage, the motor can slip off from the recess due to impact produced by an inadvertent drop of the telephone set by the user.

OBJECTS AND SUMMARY OF THE INVENTION

It is therefore an object of the present invention to reduce the work required to attach a vibrator.

Another object of the present invention is to prevent the rotational shaft of the motor from being deformed due to impact produced by an inadvertent drop of the portable terminal or the like.

A further object of the present invention is to prevent a motor from slipping off from the housing of the portable terminal.

In order to achieve the above objects, the present invention provides a vibrator attaching structure including:

a housing of a portable terminal;

an aperture formed in the housing;

a vibrator for vibrating the housing; and a vibrator holder holding said vibrator and fitted into the aperture.

In another aspect, the present invention provides a vibrator holder for attaching a vibrator which includes a motor and a counterweight attached to a rotational shaft of the motor which is attached to a portable terminal, including:

a holding section having a substantially U-like cross section for holding the vibrator therebetween.

In a further aspect, the present invention provides a vibrator fixing method including the steps of:

removing from a housing of a portable terminal a closure which closes an aperture in the housing;

fitting a vibrator holder which holds a vibrator which vibrates the housing into the aperture;

attaching the vibrator holder and the vibrator held in the holder to the aperture; and closing the window with the closure.

BRIEF DESCRIPTION OF THE DRAWINGS

FIGS. 1A and 1B are a front view and a side view, respectively, of a portable telephone set as a first embodiment of the present invention;

FIGS. 6A, B, C, D, E, F and G are a front view, side view, bottom view, left-end side view, and views taken along the lines E–E', F–F' and G–G' of FIG. 6A, respectively;

FIGS. 7A, B, C, D and E are a front view of a lower portion of the portable telephone set, cross-sectional views taken along the line of the B–B', C–C' and D–D' of FIG. 7A and a bottom view of an index cover adapted to be fitted into a motor accommodating section of FIG. 7A, respectively;

FIGS. 8A, B and C are a front view, side view and end view, respectively, of a vibrator holder as a second embodiment of the present invention;

FIGS. 9A, B and C are views similar to those of FIG. 8 and of a third embodiment of the present invention;

DETAILED DESCRIPTION OF THE PRESENT INVENTION

Figure 2:
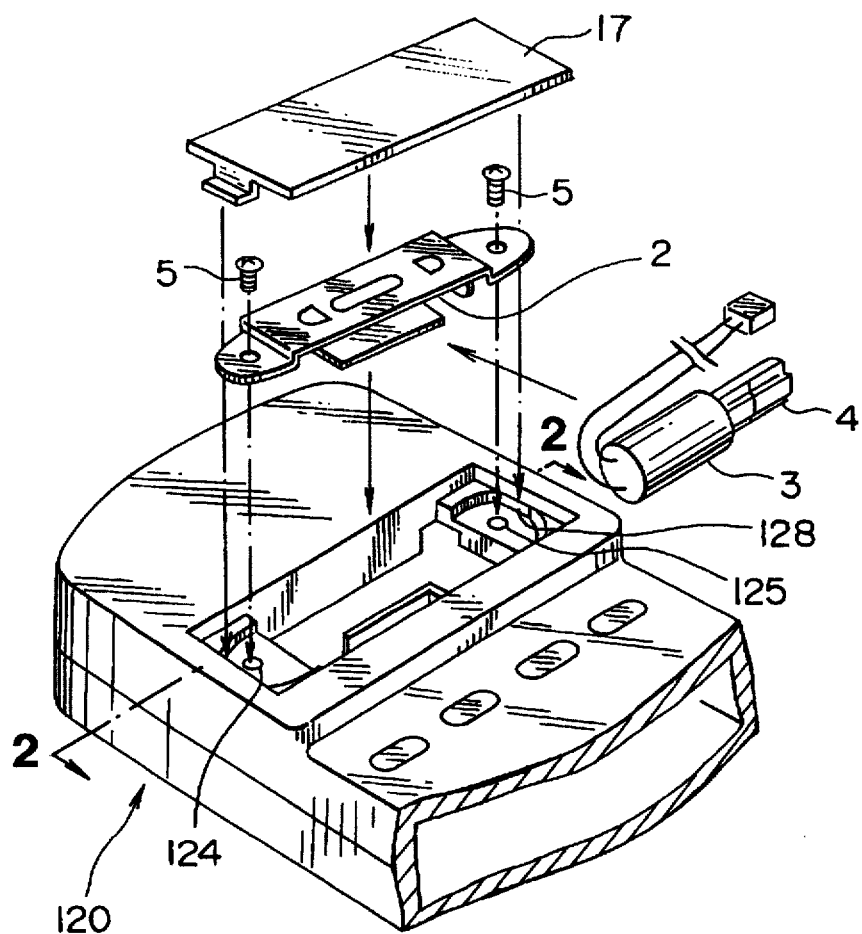
FIG. 2 shows the outline of a vibrator attaching structure as the first embodiment.

The present invention will be described next with reference to several preferred embodiments shown in the accompanying drawings.

(First Embodiment)

(Structure)

In FIG. 1, a portable telephone set (terminal) 1 has a vibrator attaching structure as a first embodiment of the present invention. In FIGS. 1A and B, the terminal has a box-like housing 12 composed of a front 12a and a back 12b which are separable from each other. The housing 12 accommodates therein a printed board 19 (FIG. 3) on which electronic parts are attached, and a vibrator which causes the housing 12 to vibrate. An antenna 13 is provided on the top of the housing 12 for transmission/reception of radio waves. Provided on the front of the housing 12 are a speaker 14 which transduces an electric signal to an acoustic signal, a display 15 which displays a telephone code of the other party, a push switch unit 16 which is used to input a destination telephone code, an index cover 17 on which a telephone code is written, and a microphone 18 which transduces an acoustic signal to an electric signal.

The index cover 17 takes the form of a rectangle with a transparent resin plate extending thereon. Provided on the back of the transparent resin plate is a sheet of paper on which a telephone code, etc., is to be written. The index cover 17 is fitted removably by the user into a window in the housing 12. A vibrator accommodating section is formed behind the index cover 17 within the housing 12. Thus, by removing the index cover 17, the user can install the vibrator within the vibrator accommodating section.

Figure 3:
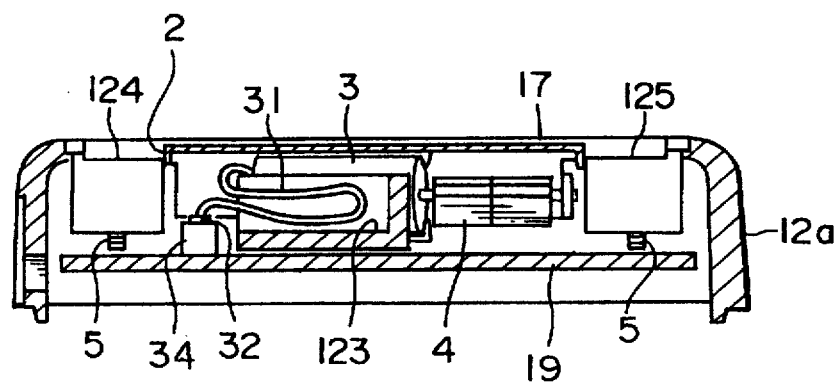
FIG. 3 is a cross-sectional view taken along the line 2—2 of FIG. 2.

In FIGS. 2 and 3, the vibrator accommodating section 120 formed within the housing 12 is composed of parallel walls 121 and 122 (FIG. 7C) extending from the opposing sides of the rectangular window into the housing 12, a lead accommodating section 123 which accommodates leads 31 for the motor 3, and nut receivers 124 and 125 integral with the housing 12, and receiving corresponding nuts 126 and 127 (FIG. 7B). The vibrator holder 2 is composed of a bent plate of a predetermined shape so as to accommodate the motor 3 therein and of a predetermined thickness, for example, of 0.3 mm, and fixed to the housing 12. The rotational shaft 33 of the motor 3 has two counterweights 4 arranged therealong and attached thereto. Each of the counterweights 4 is not symmetrical to the rotational shaft 33, and has a semicircular cross-section. The rotational shaft of the motor 3 extends through a position eccentric to the center of gravity of the counterweights 4, so that the counterweights 4 are unbalanced and, therfore, vibrations occur in the motor 3 when the counterweights 4 rotate. The two leads 31 extending from the motor 3 are connected at one end to a connector 32, which is adapted to be inserted into a receptacle 34 provided on the printed board 19.

The structure of the vibrator holder 2 will be then described with reference to FIGS. 4–6. It will be obvious from those Figures, the vibrator holder 2 is composed of a rectangular top plate 20, side plate 21 extending perpendicular to an edge or the top plate 20, bottom plate 23 extending parallel to the top plate 20, bearing plate 22 extending perpendicular to the side plate 21, and semicircular attaching plates 24, 25 perpendicular to the opposite ends or the top plate 20. As shown in FIGS. 6F and G, the holder 2 takes substantially the form of a U-like cross section which includes the top plate 20, side plate 21 and bottom plate 23.

The top plate 20 has an inner raised rectangular area 204 at substantially the center thereof which determines the position of the motor 3 relative to the top plate 20 with a pair of pawls 201 and 202 formed at opposite ends of the raised area 204 to support the motor 3 therebetween. An elongated raised area 203 is provided along an open edge of the top plate 20 of the holder 2 to increase the cross bonding strength of the top plate 20.

The top plate 20 has attaching plates 24 and 25 at the opposite ends thereof to fix the vibrator holder 2 and hence the motor 3 hold in the holder 2 to the housing 12 by screwing up screws 5 through holes 241 and 251 in the attaching plates 24 and 25 into the nut receivers 124 and 125.

The inner surface of the side plate 21 has a rectangular inward raised area 211 which determines the position of the motor 3 like the raised area 204. The bottom plate 23 has a free V-like edge portion 233 (FIGS. 6F and G) to facilitate the insertion of the motor 3 into between the top and bottom plates 20 and 23. The bottom 23 has a pair of pawls 231 and 232 at opposite ends thereof to securely hold the motor 3 therebetween in cooperation with the top plate pawls 201 and 202.

The bearing plate 22 provided at the end of the side plate 21 has at its center a circular hole 221 larger than the diameter of the rotational shaft 33 of the motor 3 such that when the free-end portion of the rotational shaft 33 is inserted into the hole 221, the rotational shaft 33 is supported normally without being put in contact with the inner periphery of the circular hole 221. When the portable telephone set is dropped inadvertently, the rotational shaft 33 to which the counterweights 4 are attached can be deformed owing to impact produced by the drop of the telephone set. At this time, the free end of the rotational shaft 33 can hit the inner periphery of the hole 221, so that the rotational shaft 33 is prevented from being deformed beyond its elastic limit. Thus, breakage of the rotational shaft 33 which may otherwise be caused when the telephone set is inadvertently dropped is avoided.

Figure 4:
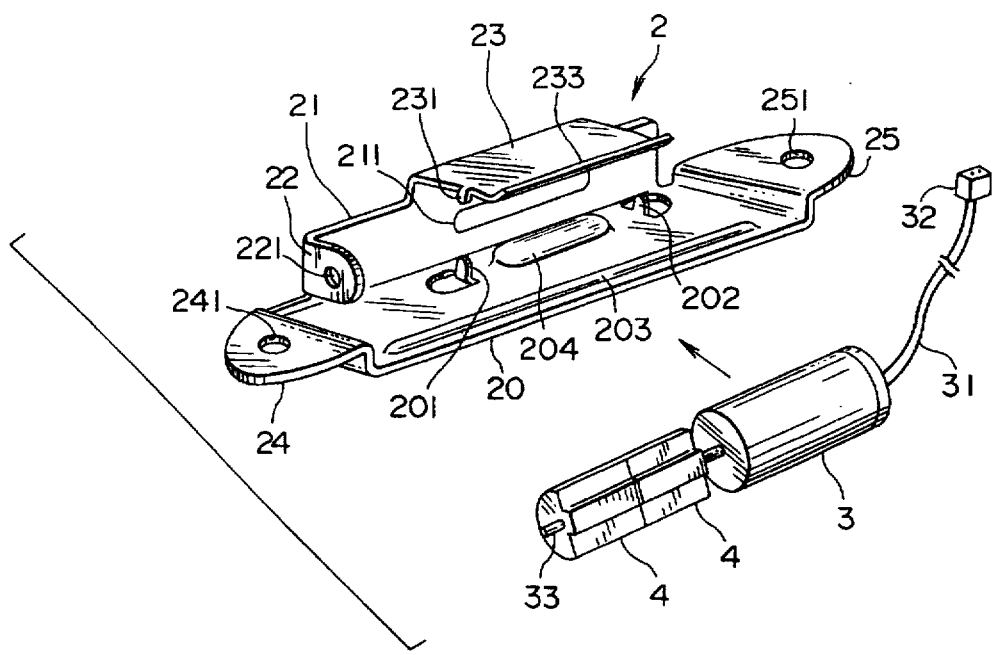
FIG. 4 is a perspective view of a vibrator holder of the first embodiment with a motor being shown as separated from the holder.
Figure 5:
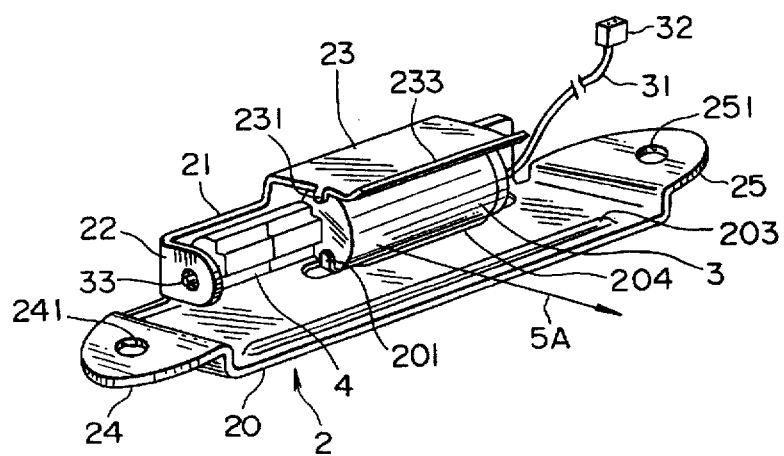
FIG. 5 is a perspective view of the vibrator holder of the first embodiment with the motor inserted therein.

When the motor 3 is to be attached to the vibrator holder 2, a free-end of the rotational shaft 33 is inserted loosely into the circular hole 221 and the motor body is inserted between the top plate 20 and the bottom plate 23, as shown in FIGS. 4 and 5. Thus, the motor 3 body is securely held within the vibrator holder 2 with the aid of the four pawls 201, 202, 231 and 232.

Next, referring to FIGS. 7A, B, C and D, the structure of the vibrator holder 2 will be described. As shown in those Figures, a vibrator accommodating section 120 with a rectangular window is formed within a lower portion of the housing front 12a. As described above, the vibrator accommodating section 123 is composed of a pair of parallel walls 121 and 122 extending from opposite longer sides of the window into the housing 12, lead accommodating section 123 which accommodates leads 31 therein, and nut receivers 124 and 125 which include nuts 126 and 127, respectively, integral with the housing, to screw up the vibrator holder 2 against the housing. The lead accommodating section 123 is composed of an L-like shelf composed of a bent plate 123a (FIG. 7C) integral with the inward wall 121 and a plate 123b which closes one side of the shelf. The lead accommodating section 123 accommodates the leads 31 from the motor 3 in a folded manner. Thus, part of the elongated lead 31 is prevented from being held between the vibrator holder 2 and the housing 12 to thereby prevent possible disconnection of the leads 31 which may otherwise occur.

If the screws 5 should often repeatedly be screwed/ unscrewed directly into/from the wall of the housing 12 to attach/remove the vibrator to/from the holder 2 without using the nut receivers and nuts, corresponding possible threads of the female screws formed directly in the housing 12 could be damaged. As will be obvious from the present embodiment, tho screws 5 are screwed into the nuts 126 and 127 received in the nut receivers 124 and 125, respectively, to thereby avoid possible damage of the threads of the female screws in the housing 12 and to achieve secure attachment of the vibrator to the housing 12, advantageously.

Referring to FIG. 7E, the index cover 17 takes the form of a rectangle with flexible edges 171 at opposite ends thereof, which are removably fitted into spacings 128 (FIG. 2) between the nut receivers 124, 125 and the wall of the housing front 12a without using any screws.

Figure 10:
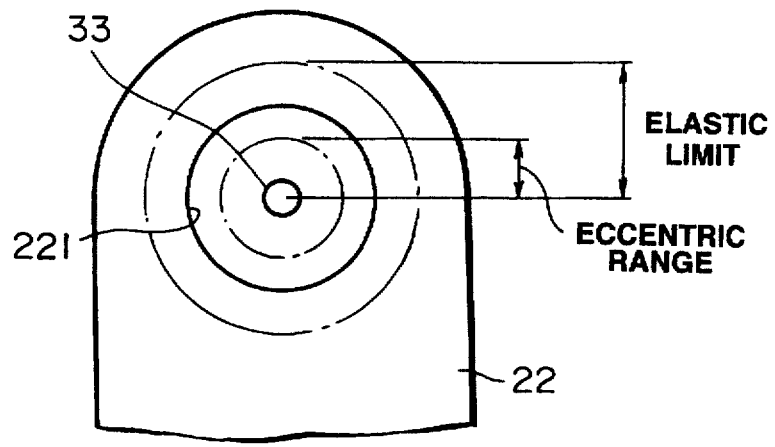
FIG. 10 illustrates the relationship between a bearing plate and the rotational shaft of the motor in the first embodiment.

As shown in FIG. 10, the radius of the circular hole 221 in the bearing plate 22 is small compared to the elastic limit of the rotational shaft 33, to which the counterweights 4 are attached, but larger than an eccentric range of the rotational shaft 33 within which the rotational shaft 33 moves when it is rotated. For example, when the elastic limit of the rotational shaft 33 whose outer diameter is 0.8 mm is 1.32 mm (FIG. 11B) and the eccentric quantity of the rotational shaft 33 is less than 1 mm, the radius of the circular hole 221 is preferably about 1 mm, (its inner diameter is 2 mm). Thus, deformation of the rotational shaft 33 beyond its elastic limit due to an impact produced when it was dropped, for example, on a hard road or floor is avoided. In the normal rotation of the rotational shafts 33, the rotational shaft 33 is arranged to be protected from coming into contact with the inner periphery of the circular hole 221 to thereby prevent generation of a rubbing sound due to contact of the rotational shaft 33 with the inner periphery of the circular hole 221.

Figure 11:
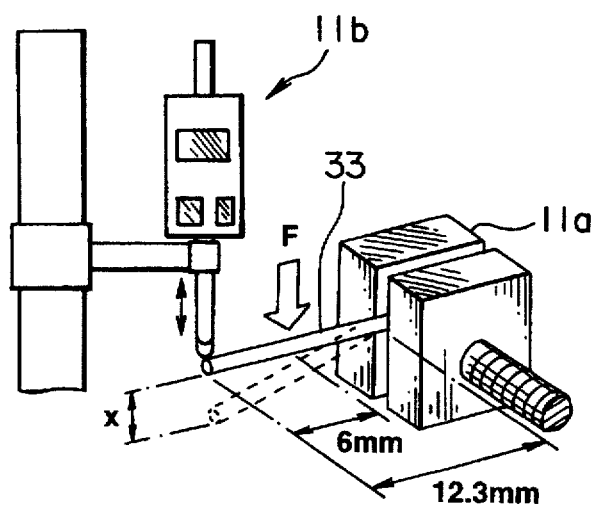
FIG. 11 illustrates a method of measuring the elastic limit of the rotational shaft of the motor of the first embodiment, respectively.

The elastic limit of the rotational shaft 33 can be measured, for example, in a manner shown in FIG. 11, which is hereinafter described in more detail. In FIG. 11A, first, the rotational shaft 33 is held by a vice 11a such that the length of a portion of the rotational shaft 33 extending outward from the vice 11a is 12.3 mm. A gradually increasing weight F is applied substantially at a midpoint of the rotational shaft 33 (6 mm from the free-end of the rotational shaft 33). The value of the weight F present directly before the elastic limit of the rotational shaft 33 is encountered is measured. At this time, a range of deformation of the free-end of the rotational shaft 33 (the elastic limit x) is measured by a digital height gauge 11b. If the range of deformation is not more than 0.05 mm when the value of the weight F is 0, this range of deformation is regarded as falling within a certain tolerance and no deformation of the rotational shaft 33 is regarded as occurring. In this case, the outer diameter, material and hardness of the rotational shaft 33 used were 0.8 mm, SUS420J2, 600 (HV), respectively. The result of this measurement is shown in Table below, from which it is confirmed that the elastic limit x of the rotational shaft is 1.32 mm when the weight F is 2.96 Kg (average value).

TABLE

| Example No. | Elastic Limit x [mm] | Load [kg] |
| --- | --- | --- |
| 1 | 1.25 | 3.3 |
| 2 | 1.40 | 2.7 |
| 3 | 1.30 | 2.1 |
| 4 | 1.35 | 2.9 |
| 5 | 1.20 | 2.8 |
| 6 | 1.25 | 2.9 |
| 7 | 1.40 | 3.5 |
| 8 | 1.25 | 2.7 |
| 9 | 1.30 | 3.2 |
| 10 | 1.50 | 3.5 |
| Average | 1.32 | 2.96 |
| Standard Deviation | 0.087 | 0.408 |

(Assembling)

When the motor 3 is attached into the vibrator holder 2, the rotational shaft 33 of the motor 3 is inserted at a free end into the circular hole 221 in the bearing plate 22 while pushing the motor 3 in between the top plate 20 and tho bottom plate 23 (FIGS. 4 and 5). By this operation, the motor 3 in fixed among the pawls 201, 202, 231 and 232, so that the motor 3 is prevented from slipping off from the holder. Such unitized vibrator assembly composed of the holder 2 and the motor held in the holder is preferably provided for the user to prevent a possible breakage or the rotational shaft 33 during the transportation of the vibrator.

When the user requires the function of tho vibrator after buying a portable telephone set, which has no vibrator therein, he is required to buy the unitized vibrator assembly. The user then removes the index cover 17 from the housing 12, and also removes a plate (not shown) having substantially the same shape an the top plate 20 of the vibrator holder 2 attached by the screws 5 to the nut receivers 124 and 125. The removed plate and screws are saved for attaching the plate and vibrator again.

The user inserts the connector 32 of the motor 3 into the receptacle 33 on the printed board 19 to thereby enable the motor 3 to be fed with electric power (FIG. 3). The user then accommodates the leads 31 into the load accommodating section 123 and the vibrator into the vibrator accommodating section 120. Subsequently, the user fastens the screw plates 24 and 25 of the holder 2 to the nut receivers 124 and 125 of the housing 12 with screws 5 to thereby fix the vibrator securely to the housing 12. First, the user fits the index cover 17 into the housing 12 to complete the vibrator attachment.

As described above, in the present embodiment, the vibrator accommodating section 12 is formed in the housing 12 to accommodate the vibrator. Therefore, the user can attach the vibrator in the vibrator accommodating section 120 without disassembling the housing 12 to thereby reduce the work required to attach the vibrator. If the vibrator in composed of the motor and the counterweights 4, the vibrator configuration would be complicated. It would be difficult for the user to attach such vibrator by himself in the relatively narrow vibrator accommodating section. Previous incorporation of the vibrator in such vibrator holder which has a shape easily insertable into the vibrator accommodating section 120 facilitates the attachment of the vibrator. The use of the vibrator holder 2 which is easily attachable into the housing serves to simplify the configuration of the vibrator accommodating section 120 of the housing 12. As a result, the cost of producing a mold for the housing 12 is reduced. The assembly of the motor 3 and the vibrator holder 2 as a unit serves to reduce the market price of the motor assembly provided for the user.

The surface of the top plate 20 of the holder 2 becomes continuous with the surface of the housing front 12a. Thus, even when an index on which a telephone code is written is placed on the top plate 20, no distortions will occur in the index.

Possible slippage of the motor 3 from the vibrator holder 2 in the direction of arrow 5A of FIG. 5 is prevented by the inner wall 121 of the lead accommodating section 123 provided in the direction of arrow 5A even when impact is applied to the motor 3 owing to an inadvertent drop of the portable telephone set, for example, on a solid floor or road.

As described above, the rotational shaft 33 of the motor 3 is inserted at a free end into the circular hole 221. Thus, even when the telephone set is dropped and the rotational shaft 33 of the motor is deformed due to the weight of the counterweight 4, the rotational shaft 33 is brought at the free-end into contact with the inner periphery of the circular hole 221 to thereby produce no deformation of the rotational shaft 33 beyond its elastic limit and to prevent breakage of the rotational shaft 33. Since the counterweights 4 which are heavier than the conventional ones are attached to the rotational shaft 33, larger vibrations are produced. Since the radius of the circular hole 221 in selected so as to be larger than a possible eccentric range of the rotational shaft 4 in its rotation, the free and of the rotational shaft 33 in protected from coming into contact with the inner periphery of the circular hole 221. Thus, the generation of a strange sound due to rotation of the rotational shaft 33 while being in contact with the periphery of the hole 221 is avoided.

(Second Embodiment)

The second embodiment is substantially the same in structure as the first embodiment except for a vibrator holder. Thus, the construction of the second embodiment will be described mainly with reference to the vibrator holder. Referring to FIGS. 8A–C, the vibrator holder 80 is composed of a top plate 81, side plates 81, 83 and attaching plates 84, 85. The substantially rectangular top plate 81 has at one end a bearing plate 811 extending perpendicular thereto and having a circular hole 812 larger than the diameter of the motor rotational shaft 3 at the center of the bearing plate 811. Two side plates 82, 83 extend perpendicular to the top plate 81 from both its sides and have two pawls 86 each, which hold the motor 3 therein. The attaching plates 84, 85 at the opposite ends of the top plate 81 has circular holes 84a, 85a, respectively.

In the vibrator holder 80, the motor 3 is hold between the two side plates 82 and 83 with the rotational shaft 33 of the motor 3 having a free and portion which extends through the hole 812 in the bearing plate 811. The rotational shaft 31 in not in contact with the inner periphery of the hole 812 as in the first embodiment. The remaining structure or the second embodiment is substantially the same as that of the first embodiment. Thus, the second embodiment produces effects similar to those produced by the first embodiment. Since the vibrator holder 80 of the second embodiment has no bottom plate such as that shown by 23 in the first embodiment, the motor 3 may slip off from the top plate 81 into the housing 12. Therefore, means which prevents the slippage of the motor 3 are preferably provided on the housing 12 or the printed board 19.

(Third Embodiment)

The third embodiment of the present invention directed to a vibrator holder will be next described with reference to FIGS. 9A, B and C. The vibrator holder 90 is composed or a top plate 91, side plates 92, 93 and attaching plates 94, 95. The vibrator holder 90 of this embodiment is different from that of the second embodiment in that side plates 92 and 93 have a single pawl 92a and a single pawl 93a, respectively, and that the top plate 91 has a pawl 913. Thus, the motor 3 is held by the two pawls 92a, 93a of the side plates 92, 93 and the pawl 913 of the top plate 91. The third embodiment is substantially the same as the second embodiment in the remaining structure and effects thereof.

The present invention is not limited to the above embodiments and many changes and modifications are possible without departing from the spirit and scope of the present invention defined by the attached claims. For example, the present invention is also applicable to pagers. The vibrator holder may have a receptacle such that when the vibrator holder is accommodated in the vibrator accommodating section, the connector on the base plate within the housing can be inserted into the receptacle.

As described above, according to the present invention, the following effects are produced:

First, attachment of the vibrator is facilitated. According to the present invention, the user is only required to insert a vibrator holder with a motor held therein through the window formed in the housing without disassembling the housing to thereby simplify the vibrator attachment. When the vibrator is composed of a motor and counterweights, the vibrator unit itself has a complicated configuration. Thus, it would be difficult for the vibrator unit to be attached within the housing. In contrast, according to the present invention, since the vibrator is beforehand held in the vibrator holder which has a configuration which is easily insertable through the window into the housing to thereby facilitate the vibrator attachment. Since the vibrator holder has a shape which is easily attachable to the housing, the shape of the window in the housing where the vibrator is accommodated is simplified. As a result, the cost of a mold which is used to mold the housing is reduced. By inserting the vibrator holder into the accommodating section in the housing, the vibrator holder and the housing provide a substantially continuous flat surface. Therefore, for example, when the window is formed behind the index cover, an index (made of a sheet of paper) on which a telephone code can be written can be placed on the flat surface to thereby prevent the occurrence or possible distortions in the index.

Second, breakage of the rotational shaft of the motor is prevented. In the present invention, the rotational shaft of the motor with the counterweights is received loosely at a free end in the hole in the bearing plate. That is, the radius of the hole in the bearing plate is smaller than the elastic limit of the rotational shaft. Even when the rotational shaft of the motor is deformed due to impact produced by an inadvertent drop of the telephone set, the free-end of the rotational shaft hits the inner periphery of the hole. Thus, it will not be deformed beyond its elastic limit. Thus, according to the present invention, possible breakage of the rotational shaft which would otherwise occur due to dropping of the telephone set is avoided. Since the radius of the hole in the bearing plate is larger than the eccentric range of the rotational shaft, the free end of the rotational shaft is normally free from being in contact with the inner periphery of the hole in the bearing plate in use. Thus, possible generation of a rubbing sound between the rotational shaft and the inner periphery of the hole in the bearing plate is avoided.

Third, possible slippage of the vibrator from the holder due to an impact produced owing to inadvertent dropping of the telephone set is avoided. As described above, the vibrator is held in substantially the U-like section of the vibrator holder. The opening of this U-like section where the vibrator is exposed faces the wall of the housing window. Therefore, possible slippage of the vibrator from the opening in the U-like section due to impact produced by the inadvertent dropping of the telephone set is prevented by the wall facing the opening.

In addition, in the present invention, since the lead accommodating section which accommodates the leads for the motor is formed, breakage of the leads which would otherwise occur as a result of the leads being pressed between the vibrator holder and the housing window is prevented.

What is claimed is:

1. A vibrator attaching structure comprising:
   a housing of a portable communication terminal device, said housing defining a substantial exterior portion of the portable communication terminal device;
   a vibrator accommodating section formed in said housing, said vibrator accommodating section comprising a recess formed in an exterior portion of the housing distinct from a portion of the housing containing structure and circuitry relating to the portable communication terminal device;
   a vibrator for vibrating said housing, said vibrator being inserted in said recess; and
   a vibrator holder holding said vibrator and fitted into said vibrator accommodating section.

2. A vibrator attaching structure according to claim 1, wherein said vibrator holder has a holding section with an opening which has a substantially U-shaped cross section formed from one side facing said vibrator so as to hold said vibrator therein, and wherein said vibrator accommodating section has a wall opposing said opening so as to cover said opening and hold said vibrator in place when said vibrator holder is placed in said recess, said wall extending from the outer surface portion of said housing.

3. A vibrator attaching structure, comprising:
   a housing of a portable communication terminal device, said housing defining a substantial exterior portion of the portable communication terminal device;
   a vibrator accommodating section formed in said housing, said vibrator accommodating section comprising a recess formed in an exterior portion of the housing distinct from a portion of the housing containing structure and circuitry relating to the portable communication terminal device;
   a vibrator for vibrating said housing, said vibrator being inserted in said recess; and
   a vibrator holder holding said vibrator and fitted into said vibrator accommodating section;
   wherein said vibrator holder comprises:
   a top plate;
   a side plate extending perpendicular to said top plate;
   a bottom plate extending perpendicular to said side plate and parallel to said top plate; and
   a bearing plate extending perpendicular to the side plate, said bearing plate having a hole adapted to receive a free end of a rotational shaft of the vibrator when the vibrator is placed between said top and bottom plates, and wherein said bearing plate is integrally formed with said top and bottom plates;
   said vibrator accommodating section having a wall for closing a space confined by said top plate, side plate and bottom plate.

4. A vibrator attaching structure comprising:
   a housing of a portable communication terminal device, said housing defining a substantial exterior portion of the portable communication terminal device;
   a vibrator accommodating section formed in said housing, said vibrator accommodating section comprising a recess formed in an exterior portion of the housing distinct from a portion of the housing containing structure and circuitry relating to the portable communication terminal device;
   a vibrator for vibrating said housing, said vibrator being inserted in said recess; and
   a vibrator holder holding said vibrator and fitted into said vibrator accommodating section;
   wherein said vibrator holder comprises:
   a top plate;
   a side plate extending perpendicular to said top plate;
   a bottom plate extending perpendicular to said side plate and parallel to said top plate; and
   a bearing plate extending perpendicular to the side plate, said bearing plate having a hole adapted to receive a free end of a rotational shaft of the vibrator when the vibrator is placed between said top and bottom plates;
   said vibrator accommodating section having a wall for closing a space confined by said top plate, side plate and bottom slate;
   wherein when said vibrator holder is fitted into said vibrator accommodating section, said top plate of said vibrator holder closes said vibrator accommodating section.

5. A vibrator attaching structure comprising:
   a housing of a portable communication terminal device, said housing defining a substantial exterior portion of the portable communication terminal device;
   a vibrator accommodating section formed in said housing, said vibrator accommodating section comprising a recess formed in an exterior portion of the housing distinct from a portion of the housing containing structure and circuitry relating to the portable communication terminal device;
   a vibrator for vibrating said housing, said vibrator being inserted in said recess; and
   a vibrator holder holding said vibrator and fitted into said vibrator accommodating section;
   wherein said vibrator holder comprises:
   a top plate;
   a side plate extending perpendicular to said top plate;
   a bottom plate extending perpendicular to said side plate and parallel to said top plate; and
   a bearing plate extending perpendicular to the side plate, said bearing plate having a hole adapted to receive a free end of a rotational shaft of the vibrator when the vibrator is placed between said top and bottom plates;
   said vibrator accommodating section having a wall for closing a space confined by said top plate, side plate and bottom plate;
   wherein said vibrator comprises a motor and a counterweight attached to the rotational shaft of said motor.

6. A vibrator attaching structure comprising:
   a housing of a portable communication terminal device, said housing defining a substantial exterior portion of the portable communication terminal device;
   a vibrator accommodating section formed in said housing, said vibrator accommodating section comprising a recess formed in an exterior portion of the housing distinct from a portion of the housing containing structure and circuitry relating to the portable communication terminal device;

a vibrator for vibrating said housing, said vibrator being inserted in said recess; and a vibrator holder holding said vibrator and fitted into said vibrator accommodating section;

wherein said vibrator holder comprises:
  a top plate;
  a side plate extending perpendicular to said top plate;
  a bottom plate extending perpendicular to said side plate and parallel to said top plate; and
  a bearing plate extending perpendicular to the side plate, said bearing plate having a hole adapted to receive a free end of a rotational shaft of the vibrator when the vibrator is placed between said top and bottom plates;

wherein said vibrator accommodating section comprises a wall which closes the space confined by said top plate, side plate and bottom plate of said vibrator holder and a lead accommodating section for accommodating a lead for said vibrator.

7. A vibrator attaching structure comprising:

a housing of a portable communication terminal device, said housing defining a substantial exterior portion of the portable communication terminal device;

a vibrator accommodating section formed in said housing, said vibrator accommodating section comprising a recess formed in an exterior portion of the housing;

a vibrator for vibrating said housing, said vibrator being inserted in said recess;

a vibrator holder holding said vibrator and fitted into said vibrator accommodating section, the vibrator holder having a surface that lies in a plane parallel to an outer surface portion of the housing; and an index cover attached to said vibrator accommodating section and forming a flat outer surface of said housing.

8. A vibrator attaching structure according to claim 7, wherein said index cover comprises a section on which characters may be written.

9. A vibrator holder for holding a vibrator including a motor having a rotational shaft and a counterweight attached to the rotational shaft, the vibrator holder comprising:
  a top plate;
  a side plate extending perpendicular to said top plate;
  a bottom plate extending perpendicular to said side plate and parallel to said top plate such that the vibrator is held between said top and bottom plates; and
  a bearing plate disposed perpendicular to a longitudinal axis of the rotational shaft, said bearing plate having a hole for loosely receiving a free end of the rotational shaft, and wherein said bearing plate is integrally formed with said top and bottom plates;

wherein said counterweight is located between the motor and the bearing plate.

10. A vibrator holder for holding a vibrator including a motor having a rotational shaft and a counterweight attached to the rotational shaft, the vibrator holder comprising:
  a top plate;
  two side plates extending perpendicular to said top plate such that the vibrator is held between said top plate and said two side plates; and
  a bearing plate disposed perpendicular to a longitudinal axis of the rotational shaft, said bearing plate having a hole for loosely receiving a free end of the rotational shaft, and wherein said bearing plate is integrally formed with said top and side plates;

wherein said counterweight is located between the motor and the bearing plate.

11. A vibrator holder for holding a vibrator including a motor having a rotational shaft and a counterweight attached to the rotational shaft, the vibrator holder comprising:
  a top plate;
  a side plate extending perpendicular to said top plate;
  a bottom plate extending perpendicular to said side plate and parallel to said top plate such that the vibrator is held between said top and bottom plates;
  a bearing plate disposed perpendicular to a longitudinal axis of the rotational shaft, said bearing plate having a hole for loosely receiving a free end of the rotational shaft, and wherein said bearing plate is integrally formed with said top, side and bottom plates;

wherein said counterweight is located between the motor and the bearing plate; and wherein said bottom plate has a bent portion formed at an opposite end of the bottom plate from said side plate and extending toward said top plate.

12. A vibrator attaching method comprising:

removing from a housing of a portable communication terminal device a closure which closes a vibrator accommodating section a portion of the housing distinct from a portion of the housing containing structure and circuitry relating to said portable communication terminal device;

fitting a vibrator holder into the vibrator accommodating section, the vibrator holder holding a vibrator for vibrating the housing;

attaching the vibrator holder and the vibrator held in the holder to the vibrator accommodating section; and closing the vibrator accommodating section with the closure, the closure being part of the vibrator holder.

13. A vibrator fixing method according to claim 12, comprising the step of accommodating a lead for the vibrator in a lead accommodating section formed on a wall of the vibrator accommodating section.

14. A portable communication terminal device comprising:

a housing defining a substantial exterior portion of the terminal device;

a vibrator accommodating section formed in said housing, said vibrator accommodating section comprising a recess formed in an exterior portion of the housing distinct from a portion of said housing where structure and circuitry relating to the portable communication terminal device;

a vibrator for vibrating said housing, said vibrator being inserted in said recess; and a vibrator holder for holding said vibrator and fitted into said vibrator accommodating section, the vibrator holder having a surface that lies in a plane parallel to an outer surface portion of the housing.

15. A portable communication terminal according to claim 14, wherein said vibrator holder has a holding section which has a substantially U-shaped cross section in which said vibrator is held and wherein said vibrator accommodating section has a wall opposing an opening in said holding section.

16. A portable communication terminal comprising:

a housing defining a substantial exterior portion of the terminal device;

a vibrator accommodating section formed in said housing, said vibrator accommodating section comprising a recess formed in an exterior portion of the housing distinct from a portion of said housing where structure and circuitry relating to the portable communication terminal device;

a vibrator for vibrating said housing, said vibrator being inserted in said recess; and a vibrator holder for holding said vibrator and fitted into said vibrator accommodating section;

wherein said vibrator holder comprises:

a top plate;

a side plate extending perpendicular to said top plate;

a bottom plate extending perpendicular to said side plate and parallel to said top plate; and a bearing plate extending perpendicular to the side plate, said bearing plate having a hole adapted to receive a free end of a rotational shaft of the vibrator when the vibrator is placed between said top and bottom plates;

said vibrator accommodating section having a wall for closing a space confined by said top plate, side plate and bottom plate;

wherein said top plate, said bottom plate, said side plate and said bearing plate are integrally formed.

17. A portable communication terminal comprising:

a housing defining a substantial exterior portion of the terminal device;

a vibrator accommodating section formed in said housing, said vibrator accommodating section comprising a recess formed in the exterior portion of the housing distinct from a portion of said housing where structure and circuitry relating to the portable communication terminal device;

a vibrator for vibrating said housing, said vibrator being inserted in said recess; and a vibrator holder for holding said vibrator and fitted into said vibrator accommodating section;

wherein said vibrator holder comprises:

a top plate;

a side plate extending perpendicular to said top plate;

a bottom plate extending perpendicular to said side slate and parallel to said top plate; and a bearing plate extending perpendicular to the side plate, said bearing plate having a hole adapted to receive a free end of a rotational shaft of the vibrator when the vibrator is placed between said top and bottom plates;

said vibrator accommodating section having a wall for closing a space confined by said top plate, side plate and bottom plate;

wherein said top plate, said bottom plate, said side plate and said bearing plate are integrally formed; and wherein when said vibrator holder is fitted into said aperture, said top plate of said vibrator holder closes said aperture.

18. A portable communication terminal according to claim 16, wherein said vibrator comprises a motor and a counterweight attached to the rotational shaft of said motor.

19. A portable communication terminal according to claim 16, wherein said vibrator accommodating section comprises a wall which closes the space confined by said top plate, side plate and bottom plate of said vibrator holder and a lead accommodating section for accommodating a lead for said vibrator.

20. A portable communication terminal according to claim 14, comprising an index cover attached to said vibrator accommodating section and forming a part of an outer surface of said housing.

21. A portable communication terminal according to claim 20, wherein said index cover comprises a section on which characters may be written.

22. A portable communication terminal device comprising:

a housing;

a vibrator accommodating section formed in said housing, said vibrator accommodating section comprising a recess formed in an exterior surface portion of the housing distinct from a portion of said housing where structure and circuitry relating to the portable communication terminal device; and a vibrator holder fitted into said vibrator accommodating section for holding a vibrator which vibrates said housing such that a surface of the vibrator holder lies in a plane parallel with an outer surface portion of the housing.

23. A portable communication terminal according to claim 22, comprising a vibrator which vibrates said housing and held in said vibrator holder.

24. A vibrator comprising:

a motor having a rotational shaft;

a counterweight attached to the rotational shaft; and a bearing plate disposed perpendicular to a longitudinal axis of the rotational shaft, said bearing plate having a hole for loosely receiving a free end of the rotational shaft such that during operation the rotational shaft does not contact an inner surface of the hole in the bearing plate;

wherein said counterweight is located between the motor and the bearing plate.

25. A vibrator comprising:

a motor having a rotational shaft;

a counterweight attached to the rotational shaft; and a bearing plate disposed perpendicular to a longitudinal axis of the rotational shaft, said bearing plate having a hole for loosely receiving a free end of the rotational shaft such that during operation the rotational shaft does not contact an inner surface of the hole in the bearing plate;

wherein said counterweight is located between the motor and the bearing plate; and wherein radius of the hole in the bearing plate is smaller than an elastic limit of the rotational shaft and larger than an eccentric range of the rotational shaft in its rotation.

26. A vibrator according to claim 25, wherein the bearing plate is formed as a part of a holding section for holding said motor.

27. A vibrator attaching structure comprising:

a portable communication terminal device having a substantial exterior portion;

a vibrator accommodating section formed in said portable communication terminal device, said vibrator accommodating section comprising a recess formed in the exterior portion of the portable communication terminal device;

said recess formed in a portion of said portable communication terminal device distinct from a portion of said portable communication terminal device containing structure and circuitry;

a vibrator for vibrating said portable communication terminal device, said vibrator being inserted in said recess; and a vibrator holder holding said vibrator and fitted into said vibrator accommodating section;

a surface of the vibrator holder lies a plane with the outer surface of the portable communication terminal device.

* * * * *